Dec. 8, 1953  F. M. GUY ET AL  2,661,985
SHAFT HANGER CONSTRUCTION
Filed Sept. 14, 1950
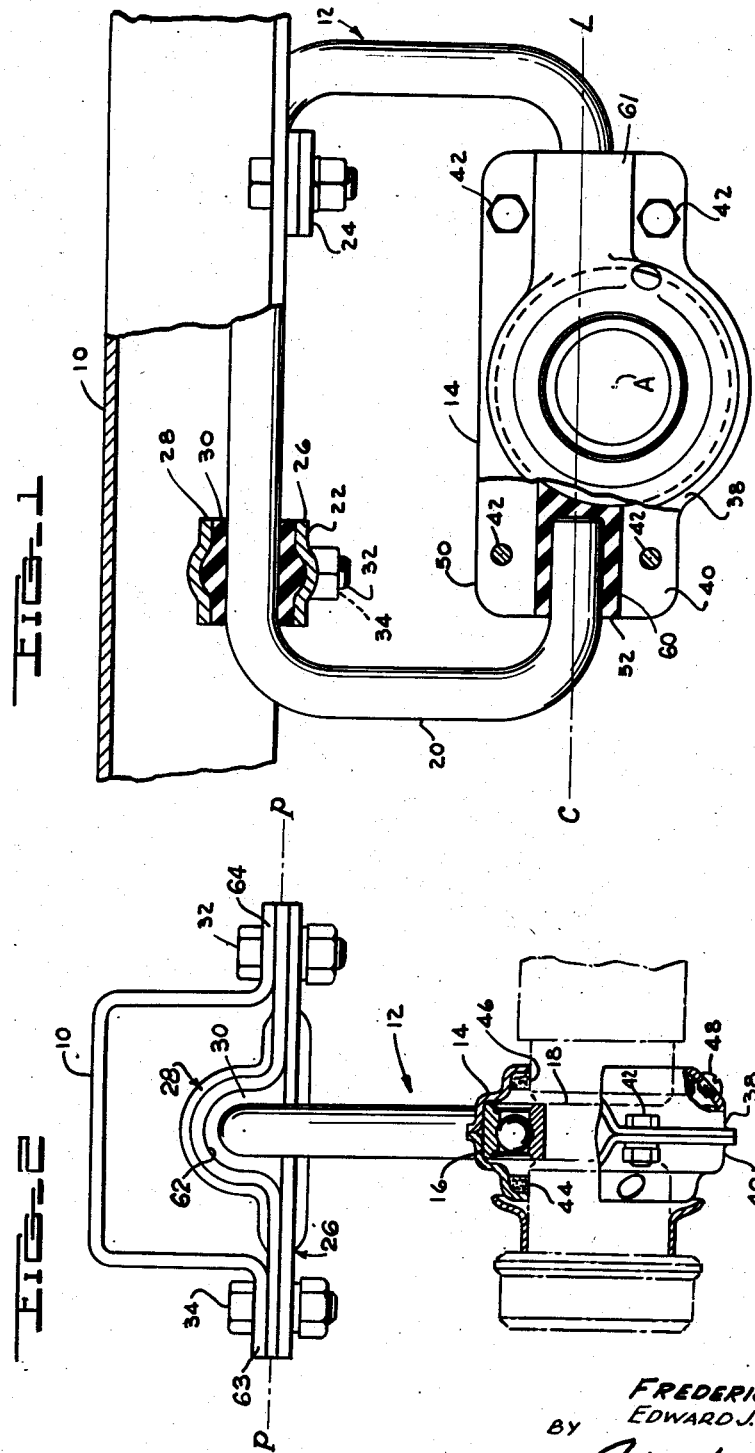
INVENTOR.
FREDERICK M. GUY
EDWARD J. HERBENAR
BY
ATTORNEY Patented Dec. 8, 1953

2,661,985

UNITED STATES PATENT OFFICE 2,661,985

SHAFT HANGER CONSTRUCTION

Frederick M. Guy and Edward J. Herbenar, Detroit, Mich., assignors, by direct and mesne assignments, to Thompson Products, Inc., Cleveland, Ohio, a corporation of Ohio Application September 14, 1950, Serial No. 184,848

20 Claims. (Cl. 308—28)

The present invention relates to a resilient shaft hanger, which is particularly but not exclusively, adapted for use in motor vehicle constructions to provide a flexible support for a driven shaft, or the like, which may be subjected to forces causing any of a variety of movements relative to a supporting member.

This invention is an improvement over prior types of shaft hangers for motor vehicles in that it has a simplified structure enabling it to be manufactured and installed at a lower cost than could be had with prior shaft hangers. By virtue of this improvement, considerable savings can be realized by the manufacturers of automobiles in the initial cost thereof.

It is among the objects of the present invention to provide a resiliently mounted shaft hanger which allows universal movement within predetermined limits of the supported shaft relative to a fixed point of attachment of the hanger to a supporting member, said shaft hanger being characterized by its relatively simple and few parts, permitting it to be easily assembled and installed on the motor vehicle, thereby reducing labor costs as well as costs of material.

It is another object of the present invention to provide a resiliently mounted shaft hanger particularly adapted for use in supporting a flexibly mounted rigid rotatable shaft and to permit its bodily movement relative to a supporting structure by means of resilient members which provide cushioning action as well as acoustic insulation.

It is still another object of the present invention to provide a resiliently mounted shaft hanger which is characterized by the relatively simple hanger arm construction as well as the simple arrangement for resiliently joining the hanger arm to the housing of the shaft journaling bearing, thereby facilitating assembly of the component parts while providing a structure especially well adapted to permit limited universal movement of the shaft and to prevent transmission of sounds or vibration from the shaft to the supporting structure.

Other objects of this invention will appear in the following description and appended claims, reference being had to the accompanying drawings forming a part of this specification wherein like reference characters designate corresponding parts in the several views.

In the drawings:

Fig. 1 is a front elevational view, parts shown in section, showing the present shaft hanger mounted on a fragmentary portion of a supporting structure; and Fig. 2 is a side elevational view of the present shaft hanger and shows a shaft in phantom supported thereby.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the accompanying drawings, the shaft hanger of the present invention is shown which is particularly well adapted for use with motor vehicles as is more fully explained in Guy Patent No. 2,450,279, issued September 28, 1948, to which reference is hereby made.

A motor vehicle supporting structure is shown at 10 to which the shaft hanger 12 is resiliently secured. The shaft hanger 12 includes a housing 14 within which is a shaft journaling bearing 16 adapted to receive a spline shaft 18 or the like, which can be seen in Fig. 2 in phantom. A shaft hanger arm structure 20 has its ends resiliently mounted in opposite sides of the housing 14 and has its upper end resiliently connected to the motor vehicle supporting structure 10 by the supporting brackets 22 and 24.

The supporting brackets 22 and 24 are formed from any suitable metal clamping members 26 and 28 between which a resilient bushing 30 can be clamped to the upper portion of the hanger arm structure 20. The clamping members 26 and 28 are held together by the nut and bolt arrangement 32 and 34. If desired, the resilient bushing member 30 can be bonded to the clamping members 26 and 28 as well as to the hanger arm structure 20, and the bushing member 30 can be preloaded to any desired extent by selecting a desired size of bushing 30 and clamping the same under a desired pressure as a result of drawing together the nut and bolt arrangement 32 and 34.

The hanger arm structure 20 can be made from any suitable bar stock material, and preferably is made from bar stock which has a circular cross section. However, if desired, the hanger arm structure can be made from bar stock having a suitable cross section other than the circular cross section shown. The hanger arm structure 20 is formed by cutting the bar stock to the proper length and shaping it to the configuration shown in Fig. 1. It is believed to be readily understood that this hanger arm structure 20 can be manufactured in any of a number of ways in a very economical manner and from materials of relatively low cost.

The housing 14 is formed from two opposed sections 38 and 40 which can be held together by a plurality of bolts 42. The opposed sections 38 and 40 can be formed from sheet metal stampings, and if desired, can be identical in shape to make them interchangeable and thereby reduce the cost of manufacturing the same. The opposed sections 38 and 40 are shaped to enable them to rigidly secure the bearing member 16 therebetween and also are shaped to permit grease sealing members 44 and 46 to be secured therein. Any suitable grease sealing cap 48 may be used.

The opposed sections 38 and 40 have flat end sections 50 within which are shaped opposed semicircular recesses adapted to receive rubber resilient bushing members 52. The bushings 52 are cup-shaped and have their open ends faced outwardly to receive the inturned ends of the hanger arm structure 20. The ends are of sufficient length to engage the bottom of the cup-shaped resilient bushings 52 to provide a secure, but resilient, mounting for the ends of the hanger arm structure 20. Thus, it can be seen that the hanger arm structure 20 is mounted within the housing 14 so as to provide limited universal movement of the hanger arm structure with respect to the housing 14.

It will be noted that the center line, C—L, of the aligned end sockets 60 and 61 of said bearing housing 14 is offset from the axis A of the housing. Thus, the vertical spatial relationship between the axis A of the housing and the supporting structure 10 can be varied by inverting the shaft bearing housing 14 so that the axis A of the housing is above, instead of below, the center line C—L of the sockets.

Also, the clamping members 26 and 28 comprise a plate and a strap, respectively, and the strap has a looped portion 62 offset from the main parting line between said clamping members within which the resilient bushing member 30 is confined. It is, therefore, entirely feasible to make a further variation in the spatial distance between the axis A of the bearing housing 14 and the supporting structure 10 by inverting the arrangement of the clamping members 26 and 28 so that the bushing 30 is below rather than above the plane P—P of the clamping members 22 and 24, as shown in Figure 2. Said plane P—P is parallel to the plane of the flanges 63 and 64 of the structural channel beam constituting the supporting structure 10.

From the above description it can be seen that universal movement of the shaft 18 with respect to the motor vehicle supporting structure 10 is provided by virtue of the resilient bushings 52 and the resilient bushings 30. Not only is universal movement permitted, but also the bushings 30 and 52 effect sound insulation of any noises which might be transmitted from the shaft to the supporting structure of the motor vehicle, as well as to prevent direct transmission of vibration from the shaft to the supporting structure and vice versa.

It is also believed to be readily apparent that the present shaft hanger is a relatively simple construction with few parts which can be easily manufactured and assembled. This results in low manufacturing costs since the costs of labor as well as the cost of materials will be relatively low in the manufacture of this shaft hanger. Also, the cost of assembling the shaft hanger on the motor vehicle will be considerably lower than with shaft hangers heretofore known.

Having thus described our invention, we claim:

1. A resilient shaft hanger comprising a housing, a shaft journaling bearing carried in said housing, a pair of resilient bushings mounted in opposite sides of said housing, a C-shaped support member having each of its ends extending respectively into said resilient bushings, and a support bracket for attaching a portion of said C-shaped member intermediate its ends to a supporting structure.

2. A resilient shaft hanger comprising a housing, a shaft journaling bearing carried in said housing, a pair of resilient bushings mounted in opposite sides of said housing, a C-shaped support member having each of its ends extending respectively into one of said resilient bushings, and a pair of spaced support brackets adapted to be secured to a supporting structure and having resilient bushings therein for carrying said C-shaped member intermediate the ends of the latter.

3. A resilient shaft hanger comprising a housing formed from two sheet metal stampings secured together, a shaft journaling bearing carried in said housing between said stampings, a pair of resilient bushings mounted in opposite sides of said housing between adjacent surfaces of said stampings, a C-shaped support member having each of its ends extending respectively into said resilient bushings, and a support bracket for attaching a portion of said C-shaped member intermediate its ends to a supporting structure.

4. A resilient shaft hanger comprising a housing, a shaft journaling bearing carried in said housing, a pair of resilient bushings mounted in opposite sides of said housing, said resilient bushings being cup-shaped with their open ends facing in opposite directions, a C-shaped support member having each of its ends extending respectively into said resilient bushings and into engagement with the bottoms thereof, and a support bracket for attaching a portion of said C-shaped member intermediate its ends to a supporting structure.

5. A resilient shaft hanger comprising a housing, a shaft journaling bearing carried in said housing, a pair of resilient bushings mounted in opposite sides of said housing, a support member formed from bar stock and having a horizontal upper portion, vertical arms depending from the ends of the horizontal upper portion, and the lower ends of said vertical arms extending inwardly in a horizontal direction toward each other, said lower ends being received respectively within said resilient bushings, and means for securing said support member to a supporting structure.

6. A resilient shaft hanger comprising a housing, a shaft journaling bearing carried in said housing, a pair of resilient bushings mounted in opposite sides of said housing, a support member formed from round bar stock and having a horizontal upper portion, vertical arms depending from the ends of the horizontal upper portion, and the lower ends of said vertical arms extending inwardly in a horizontal direction toward each other, said lower ends being received respectively within said resilient bushings, and brackets disposed on the horizontal upper portion of said support member for securing the shaft hanger to a supporting structure, said brackets having resilient bushings within which said support member is mounted.

7. A resilient shaft hanger comprising a housing formed from two sheet metal stampings secured together, a shaft journaling bearing carried in said housing between said stampings, a pair of resilient bushings mounted in opposite sides of said housing between adjacent surfaces of said stampings, a support member formed from round bar stock and having a horizontal upper portion, vertical arms depending from the ends of the horizontal upper portion, and the lower ends of said vertical arms extending inwardly in a horizontal direction toward each other, said lower ends being received respectively within said resilient bushings, and means for securing said support member to a supporting structure.

8. In a resilient shaft hanger, a housing formed from two sheet metal stampings secured together for receiving a shaft journaling bearing, a pair of resilient bushings mounted in opposite sides of said housing between adjacent surfaces of said stampings, said resilient bushings being cup-shaped with their open ends facing outwardly of the housing and adapted for receiving portions of hanger arms.

9. In a hanger mounting assembly for supporting a driven shaft from a structural member, brackets secured to said member, a first set of pre-load resilient bushings carried by said brackets and having aligned bores, and a hanger having a straight portion thereof extending through and mounted in said bushings and having a dependent portion providing spaced opposed ends, a shaft bearing housing between said ends having aligned sockets for receiving said ends and a second set of pre-loaded resilient bushings in said sockets about said ends.

10. In a hanger mounting assembly for suspending a bearing housing for a driven shaft from a structural beam, brackets adapted to be secured to said beam and having spaced portions defining aligned openings, pre-loaded rubber bushings in said openings, a shaft bearing hanger having a portion extending through and resiliently mounted in said bushings, and having other portions for supporting the shaft bearing housing.

11. In a hanger mounting assembly for suspending a driven shaft from a structural channel beam open on its lower side and having flanges extending therealong, brackets secured to said flanges spanning said open side and having spaced portions defining aligned openings, pre-loaded rubber bushings in said openings, a shaft bearing hanger in the form of an integral C having a straight cylindrical portion mounted in said bushings and having opposed spaced end portions in alignment with each other, a shaft bearing housing having aligned sockets for receiving said end portions and pre-loaded rubber bushings in said sockets mounting said end portions.

12. In combination, a structural support, a hanger for suspending a shaft bearing housing from said support at varying adjustable heights of the shaft axis, said hanger being an integral C-shaped bar having spaced opposed ends, said shaft bearing housing having aligned sockets for receiving said ends, the centerline of said sockets being offset from and at right angles to the axis of said housing, pre-loaded rubber bushings in said sockets in which said ends are mounted, brackets for attachment to said support having looped portions defining openings, pre-loaded rubber bushings in said openings for mounting the long portion of said C-shaped bar, and means for securing said brackets to said support with said loops looped upwardly or downwardly to vary the distance of said axis below said support.

13. In combination, a member providing a plane supporting surface, a bearing housing for supporting a shaft in a plane generally parallel to said first plane, an integrally formed C-shaped hanger, looped straps providing with said plane supporting surface aligned apertures for receiving the long side of said hanger, said housing having aligned sockets for receiving the ends of said hanger, pre-loaded rubber bushings in said apertures and in said sockets providing resilient mountings for said hanger, and means for securing said straps to said member with the loops thereof on either side of the plane of said surface.

14. In combination, a channel structure having flanges lying in the same plane, a shaft bearing housing formed of mating halves providing aligned sockets the center line of which is at right angles to and offset from the axis of said housing, an integral C-shaped hanger, looped straps, plates assembled with said straps to provide aligned apertures, means for attaching said assembled plates and straps to said flanges with the loops extending into or away from the open side of said channel, and pre-loaded rubber bushings in said apertures and in said sockets providing a mounting for the long side and the short ends respectively of said hanger.

15. In combination, a channel structure having flanges lying in the same plane, a shaft bearing housing formed of mating halves providing aligned sockets the center line of which is at right angles to and offset from the axis of said housing, an integral C-shaped hanger, looped straps, plates assembled with said straps to provide aligned apertures, means for attaching said assembled plates and straps to said flanges with the loops extending into or away from the open side of said channel, pre-loaded rubber bushings in said apertures and in said sockets providing a mounting for the long side and the short ends respectively of said hanger and means clamping said housing halves together with their parting plane in the median plane of said hanger, whereby said housing may be positioned with its axis on one side or the other of said center line.

16. A resilient shaft hanger assembly for suspension from a channel-shaped structural frame, comprising members including closed loops providing apertures, means for securing said members to said frame with the loops extending into or away from the open channel of said frame, mating halves providing when assembled a shaft bearing housing having aligned sockets the center line of which is at right angles to the axis of said housing but offset therefrom, a hanger having a portion extending through said loops and other portions terminating in said sockets, and pre-loaded rubber bushings in said loops and in said sockets providing a resilient mounting for said hanger.

17. A resilient shaft hanger assembly for suspension from a channel-shaped structural frame, comprising members including closed loops providing apertures, means for securing said members to said frame with the loops extending into or away from the open channel of said frame, a bearing housing having aligned sockets and an axis eccentric with respect to the center line of said sockets and at right angles thereto, an integral C-shaped hanger having a portion extending through said loops and other portions terminating in said sockets, and pre-loaded rubber bushings in said loops and in said sockets providing a resilient mounting for said hanger.

18. A resilient hanger comprising an integral metal bar bent in the form of a C, supporting means including pre-loaded rubber bushings receiving and encircling the long portion of said bar, a split housing for a shaft bearing having mating portions forming sockets for receiving the ends of said bar, thimble-like pre-loaded rubber bushings in said sockets about said bar ends, and means securing said split housing together, the axis of said housing being offset from the center line of said bar ends whereby by reversing said housing the axis thereof may be brought above or below the center line of said arm ends.

19. A resilient hanger for a driven shaft, comprising an integral metal bar of uniform circular cross-section bent into the form of a C, supporting brackets providing pre-loaded bushings about the long portion of said C, a shaft bearing housing positioned between the opposed ends of the shorter portions of said C with the axis of said housing at right angles to the center line of said shorter portions, said housing having aligned sockets offset from said axis, and thimble-like pre-loaded rubber bushings in said sockets receiving said ends.

20. In a resilient shaft hanger assembly, a hanger providing spaced, opposed, aligned supports, a bearing housing having aligned sockets for receiving said supports, and pre-loaded rubber bushings resiliently mounting said supports in said sockets, the axis of said housing being offset from the center line of said sockets, and the bearing housing being rotatable about the axis of said sockets to change the relative position of the housing axis to the axis of said sockets.

FREDERICK M. GUY.
EDWARD J. HERBENAR.

References Cited in the file of this patent
UNITED STATES PATENTS

| Number | Name | Date |
|---|---|---|
| 1,871,116 | Cummings | Aug. 9, 1932 |
| 2,450,279 | Guy | Sept. 28, 1948 |